Oct. 20, 1959 W. O. FLECKENSTEIN ET AL 2,909,601

FACSIMILE COMMUNICATION SYSTEM

Filed May 6, 1957 4 Sheets-Sheet 1

INVENTORS W. O. FLECKENSTEIN
E. R. KRETZMER
W. S. MICHEL

BY Harry C. Hart

ATTORNEY

INVENTORS W. O. FLECKENSTEIN
E. R. KRETZMER
W. S. MICHEL
BY Harry C. Hart
ATTORNEY INVENTORS W. O. FLECKENSTEIN
E. R. KRETZMER
W. S. MICHEL
BY Harry C. Hart
ATTORNEY INVENTORS W. O. FLECKENSTEIN
E. R. KRETZMER
W. S. MICHEL
BY Harry C. Hart
ATTORNEY

United States Patent Office 2,909,601
Patented Oct. 20, 1959

2,909,601

FACSIMILE COMMUNICATION SYSTEM

William O. Fleckenstein, Whippany, and Ernest R. Kretzmer, New Providence, N.J., and Walter S. Michel, New York, N.Y., assignors to Bell Telephone Laboratories, Incorporated, New York, N.Y., a corporation of New York Application May 6, 1957, Serial No. 657,394

18 Claims. (Cl. 178—6.8)

This invention relates to facsimile communications and more particularly to the transmission of coded facsimile signals having a reduced bandwidth-time product.

Progress in facsimile and related fields has developed to such an extent that signals derived from text or pictorial matter may now be economically and accurately transmitted from one location to another. Although the advances in these fields have made possible the development of systems having relatively low cost, ease of operation, and reliability, there remains the need for an increase in the speed of transmission and a reduction in the bandwidth required to satisfactorily transmit a facsimile signal.

The principal object of the invention is to enable such facsimile signals to be accurately transmitted from one location to another in a substantially reduced period of time.

Not only is the time of transmission important to the ultimate customer or subscriber, but economy of transmission equipment is of great importance and, to a large extent, dictates that the service be suitable for transmission over conventional switched telephone networks. Consequently, a suitable facsimile signal should advantageously be encoded in a manner that permits the removal of substantial amounts of signal redundancy prior to transmission.

It is well known that most forms of black and white textual or pictorial material is highly redundant. That is, the regions of different brightness or shade tend to be clustered in groups quite large compared to the areas of individual picture elements or resolution dots that together comprise the picture. The signals associated with the material are, therefore, not random but exhibit a considerable degree of correlation. This correlation, which may be semantic, spatial (in facsimile and television, for example), temporal, et cetera, has been explored in the past and it has been determined that a communication system employing a channel capacity sufficient to accommodate a completely random comparison signal is inefficient to the extent that the actual signals are correlated. Consequently, it becomes desirable to encode the signals in such a way that a substantial portion of the redundancy is removed.

The savings in channel capacity requirements or transmission time, conveniently referred to as the bandwidth-time product, are generally attained at the expense and complexity of the encoding and decoding equipment employed at each end of the transmission channel. In order to determine the proper balance between bandwidth-time savings and terminal-equipment cost and complexity, additional studies have been made which indicate that certain compromises are possible which afford substantial savings without introducing objectionable signal degradation. For example, the studies of Shannon published in the Bell System Technical Journal, vol. 27, pages 379 and 623 (July and October, 1948) indicate that the bandwidth-time product can be reduced by employing statistical binary encoding.

One of the abilities of the terminal equipment that may be relinquished in order to permit more efficient encoding is that of reproducing a gray scale intermediate between absolute black and white. Although it would be desirable to handle this material, a large percentage of most common material is black and white and the limitation imposed on the remaining portion by the omission of intermediate levels does not appear to be a serious limitation for certain classes of applications.

In accordance with one aspect of the present invention, typewritten text or pictorial material to be transmitted by facsimile is encoded in terms of black and white lengths found along the customary narrow parallel scanning-line paths extending across the copy. Such a coding form is conventionally termed "run-length" or "differential-coordinate" encoding and is described, for example, in Patent 2,681,385, June 15, 1954 to B. M. Oliver. The lengths of successive black and white "runs" along a scanning line are measured and encoded for binary digital transmission according to a predetermined rule dependent upon the statistics of the material being transmitted. The code form used is advantageously based on the statistical distribution of the lengths of runs, reserving short code sequences for the most commonly occurring lengths and longer code sequences for less commonly occurring lengths. Such encoding is particularly efficient in specifying the lengths between transitions of two-valued material. This is due primarily to the fact that the total number of black and white lengths found in a typical picture is smaller than the total number of picture elements in the same picture, and the lengths, though ranging from one picture element to many hundreds, have a peaked probability distribution which can be statistically matched by variable length coding. Thus, on the average, the lengths require fewer binary digits for specification than there are individual picture elements composing them. The result is a reduction in the overall number of binary digits required for transmission; the extent of the reduction depends upon the density of the material being handled. Encoding of complex drawings and text filling an entire page yields, therefore, little saving over conventional facsimile transmission. Average typed copy or simple drawings, to the contrary, permit substantial savings. In either case, however, the material may be satisfactorily encoded in terms of a code alphabet of lengths or, in a two-dimensional case, matrix specifications, for transmission. If suitable provision is made for proper identification of the binary digit by the receiver, the receiver in such a transmission system may be constructed to reproduce an accurate facsimile of the original copy.

The encoding and decoding procedures in a facsimile system are intimately related to the scanning and printing procedures. Since the code used takes cognizance of local pictorial complexity, scanning and encoding cannot proceed at a constant rate as in a conventional system. If the scanning proceeds at a constant rate, as in conventional facsimile or television, an elastic delay or large capacity memory must be interposed between the encoder and transmission channel. This is necessary in order to obtain a constant transmission rate despite the variable length of encoded information per unit scanned length of the pictorial copy. Obviously such a system requires extremely complex instrumentation. It has previously been proposed to overcome this need for elastic delays or storage by scanning in jumps and stops, that is, scanning in a start-stop fashion in such a way as to yield a continuously flowing output signal without employing appreciable information storage. This type of scanning procedure is discussed, for example, in Communication Theory, edited by Willis Jackson, Butterworths Scientific Publications, London, 1953, at page 320. When deflected, the scanning beam of such a system proceeds at a constant rate and its total length of travel is counted, for example, in the number of pictorial elements traversed. When the beam encounters a transition from one shade to the other (black to white in most cases) the deflection stops. As soon as the encoding of the previous length count is completed and the encoder is in condition to accept more information, the beam resumes its travel along the line. Thus, intermittent scanning effectively regulates the admission of the electrical counterpart of the pictorial information being scanned to the encoder and insures that transmission is continuous. Since the uninterrupted scanning speed of the beam is fast, as compared with the transmission rate, continuity is never lost.

The receiver of such a start-stop system resembles the transmitter in its mode of operation. The decoder, upon recognizing a legitimate binary code symbol or character, translates it, and then converts it into a proportionate deflection (i.e., length of sweep) signal and identifies the signal as black or white. The deflection stops when the decoded signal length has been printed and resumes only after the next code character has been decoded. Thus, the elastic delay necessary to permit the continuous transmission of statistically encoded material is achieved in the start-stop system by controlled beam deflection instead of by elaborate memory means. However, the control circuitry for stepping a beam along a scanning line in accordance with the encoder data handling capacity places severe demands on the deflection circuitry and excludes use of conventional scanning techniques. In order to utilize deflection circuits as presently available in the open market, both for the camera pickup tube and for the display tube, it is desirable, if possible, to retain the operating speeds for which such apparatus is designed and still to derive from such apparatus a slow speed image signal suitable for transmission over a narrow band medium such as a standard telephone line.

It is a more specific object of this invention continuously to scan pictorial matter selected for statistically encoded facsimile transmission over conventional switched telephone networks to derive electrical information at a speed determined by the local characteristics of the pictorial matter.

These and other objects are attained in accordance with the invention in the following manner. In a system in which statistical encoding of a signal to be transmitted is contemplated, scanning of typewritten or pictorial material proceeds repeatedly over a scanning line path many times at a fast, constant rate. One length after the other is accepted for processing as an encoder is free to accept it. After the line has been entirely processed, scanning of the next line commences. Only a portion of the material of any one line is picked up during any one scan of the line; subsequent scans of the same line are employed to pick up the remaining material on the line. The total number of scans of a single line produces, therefore, a sequence of code characters corresponding to all of the black and white segments of the material in the line. The encoder accepts one scanner output run-length designation at a time, but only if it is empty. Outpulsing from the encoder is slow compared to the sweep rate of the scanner, and consequently no use is made of the information from the scanner in most of the line scans. In this way outpulsing may continue at a constant rate, large capacity storage means are unnecessary, and the advantages of intermittent or variable speed scanning are attained without their attending complexities.

In the receiver, as in the transmitter, each scan line is traversed many times, but many of the traversals are idle; that is, no printing takes place during most traversals. Printing does occur after a complete symbol or character has been decoded. Such printing may conveniently consist of leaving on the recording surface a black or white trace of appropriate length starting at a particular point in the scanning line as determined by previous scans of that line.

The invention will be more fully apprehended from the following detailed description of a preferred embodiment thereof taken in connection with the appended drawings in which.

*Transmitter*

Figure 1:
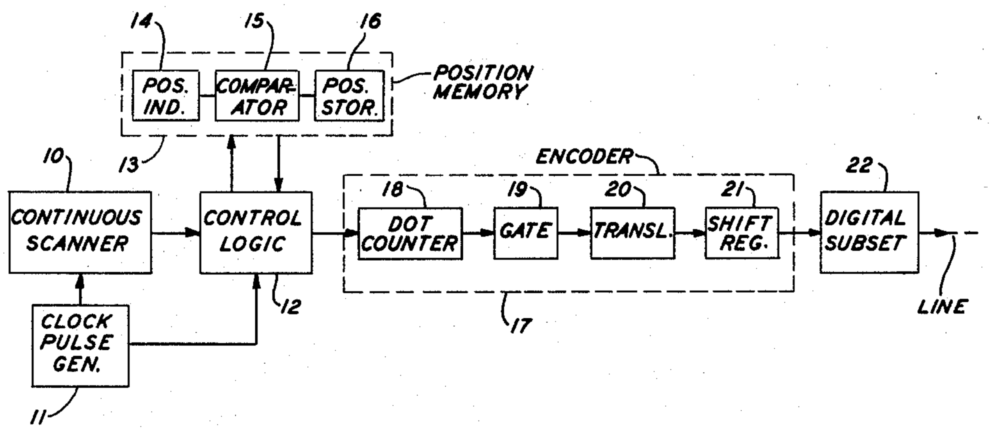
Fig. 1 is an overall block schematic diagram of a simplified illustrative embodiment of the transmitter portion of a coded facsimile system in accordance with the invention.
Figure 3:
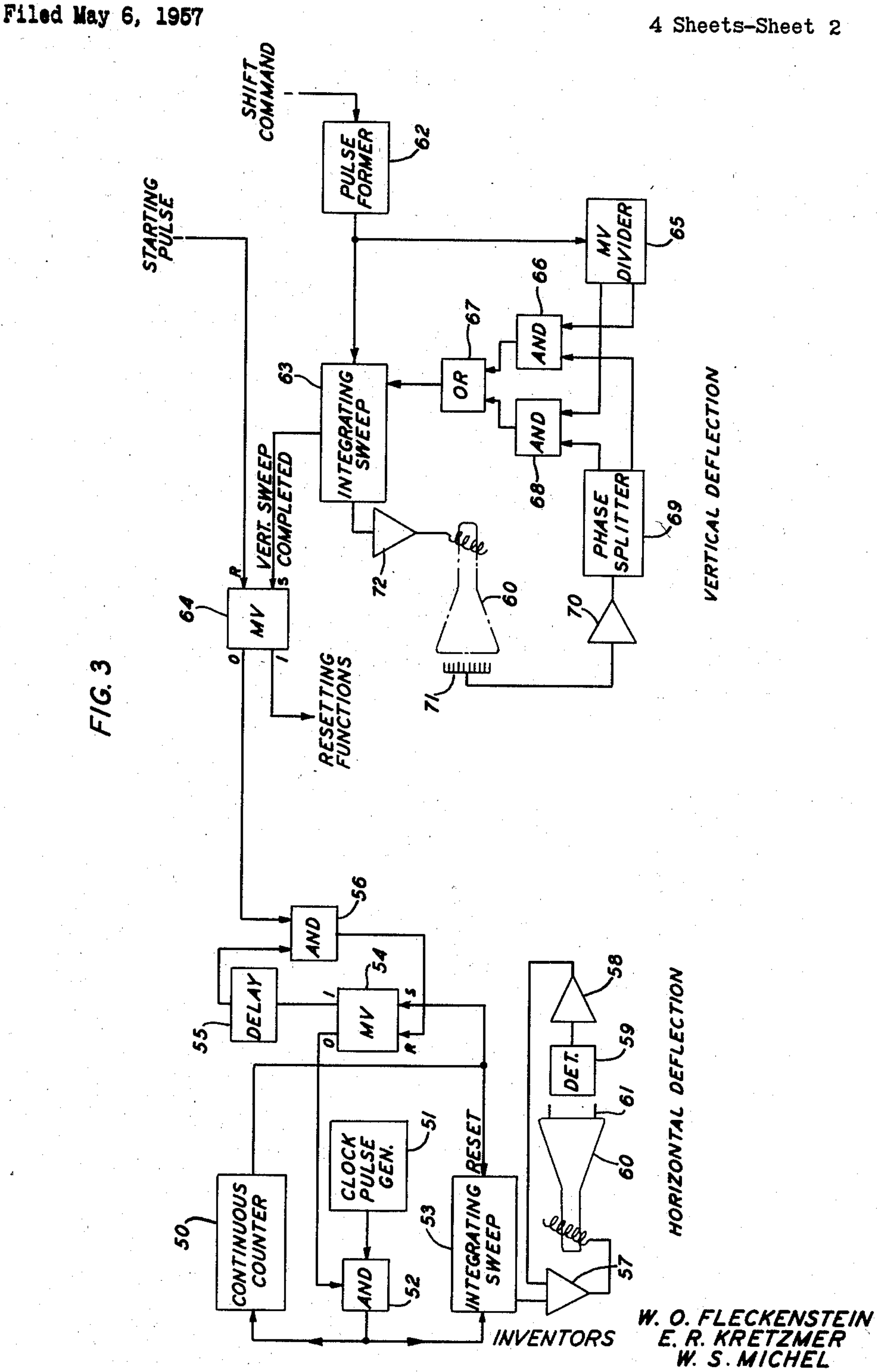
Fig. 3 is a block schematic diagram of one specific deflection circuit suitable for use in the transmitter of Fig. 1 or the receiver of Fig. 2.

Referring now in more detail to Fig. 1, the transmitter portion of the system includes a scanner 10, which in conjunction with a clock pulse generator 11, derives individual pulses corresponding to black and white picture elements or dots forming the pictorial material supplied to the scanner. The scanner 10 may be any of the mechanical or electronic devices well known in the art for translating the densities of elemental areas of typed or pictorial copy into signal waveforms. As previously mentioned, electronic scanning is generally preferred. The scanner may conveniently include a light source, an optical system which delineates elemental areas of the subject copy, means for systematically moving one with respect to the other in two directions and a light sensitive device together with directly associated circuits. The horizontal and vertical deflection circuitry for the scanner, described in detail in connection with Fig. 3, is controlled by the clock generator 11. The horizontal deflection wave advances the electron beam one picture element, or dot, each time it receives a pulse from the clock pulse generator 11, and the vertical deflection wave advances the beam one line in a second coordinate direction, i.e., vertical, upon receipt of a signal denoting the end of encoding of a complete horizontal line. The clock generator 11, in addition to supplying pulses to the scanner deflection circuits for positioning the beam accurately, supplies pulses to a position memory circuit 13 wherein a record is maintained by which the exact position of the beam is known at any instant.

The clock pulse generator 11 may be constructed in various ways. It may, for example, comprise a simple monostable or single trip multivibrator, a relaxation oscillator followed by a clipper, or the like. The frequency and duration of the generated pulses may readily be adjusted by control of the relaxation time and the amplitude of the pulses may be adjusted in well-known fashion by control of gain or loss.

The scanner 10 yields output pulses corresponding to black and white lengths traversed. It is desirable, though not at all necessary, to process these samples by slicing or equalizing in a conventional fashion. In a two-valued system this step improves the signal waveform derived from the scanner without imparting objectionable additional degradation. By this process individual pulses corresponding to black and white picture elements may be supplied on separate leads. In a preferred form, successive sequences of black and white pulses are supplied on a single lead with the appearance of a unit pulse representing a white element, for example, and the absence of a pulse in a given time period being interpreted as a black element. Under ordinary conditions sampling of the infomration on a particular line, that is, the translation of pictorial information to electrical information, takes place sequentially across the scanning line path. Depending on the type of encoding employed, however, any other preassigned order of sampling may be employed. For example, sampling of a single line may be in accordance with the distribution of sample lengths in the line.

The net result is, in either case, that the scanner moves in a first coordinate direction across the copy, i.e., in the horizontal direction, at a constant rate, and passes over a given line many times. One length after the other is processed in subsequent scans of the line according to the capacity of the encoder and its ability to produce a continuous and regular outflow of information. After the given line has been handled entirely, the scanner moves in a second coordinate direction, i.e., vertically, to the next line, and the process is repeated.

Enablement of the scanner output circuit during each sequence of scans of a single line at the precise point where the last sampling ended is insured by position memory 13 coordinated by a control logic circuit 12. The control logic circuit 12 which comprises, for the most part, a number of conventional computer elements is illustrated in a practical operative circuit in Figs. 4 and 5 to be described hereinafter. In effect this circuit takes note of each transition from black to white or white to black as it is produced by the scanner, but allows passage into the encoder 17 only when notice is received that encoding of the previous length has been completed.

In order to keep track of the point to which coding has proceeded and to permit later resumption of coding at the same point, position memory 13 includes a position indicator 14, comparator 15, and position storage circuit 16. Position indicator 14 is a recycling counter which counts to a predetermined total, for example, 850, and then starts again to count from zero. It is arranged to give a running indication, in the form of a count of a number of picture elements, of the instantaneous position of the scanning spot. The position storage circuit 16 is a counter which records the number of elemental picture areas included in that portion of the line which has already been processed. Instead of counting and storing the number of picture elements traversed, the number of black to white and white to black transitions may serve as a frame of reference. For purposes of explanation, however, a picture element type of reference is assumed. At the instant when the two counters match, as determined by the comparator 15, an encoder 17 is allowed to start accepting pulses on the condition, however, that it is empty when the match occurs.

The pulse counters 14 and 16 may each advantageously comprise a ferroelectric capacitor which passes accurately measured current pulses supplied by the clock generator 11 to a second capacitor which in turn builds up to a critical point and fires through a rectifier circuit to produce the desired output pulses at the required point in time. A counting circuit suitable for this purpose is disclosed in application Serial No. 552,549 of R. M. Wolfe filed December 12, 1955, now Patent 2,876,435 issued March 3, 1959. Alternatively, the counters may comprise conventional bistable multivibrator circuits, hereinafter designated "flip-flop" elements. The flip-flops perform the job of counting by shifting abruptly from one to the other of their two stable conditions for each received pulse. One of the stable states may be conveniently referred to as the "set" state, and the other as the "reset" state.

The comparator 15 portion of the position memory 13 develops a signal each time the position of the scanning spot, as recorded in the position indicator 14, agrees with that held at that instant in the position storage 16. This signal is transmitted to the control logic 12 and, in the event that the encoder 17 is empty, allows the next length to be counted. Comparator circuits are well known in the computer art and may take any one of a number of forms to suit the intended result.

While the pulses produced by the scanner 10, representative of the "run-lengths" of black or white segments occurring in the subject pictorial matter, may be imediately non-statistically encoded for transmission with a possible reduction in the bandwidth-time product, it is in accordance with the present invention to describe the lengths and polarities of the several areas in each scanning line in digital form, and further to achieve an additional reduction in the bandwidth-time product by utilizing the statistics of the subject copy in the encoding process. Hence, the scanner binary output pulses, as selected by the control logic 12 in the manner hereinabove described, are processed in a statistical encoder 17.

The encoder 17 comprises conventional computer elements and may advantageously include a dot counter 18, similar to the counters in the position memory, a gate circuit 19, a translator 20, and a shift register 21. It performs the functions of counting the length of the successions of black and white material supplied by the scanner and admitted by the control logic for encoding, translating the information into the desired statistical code, and outpulsing this information to a digital subset 22. The encoder thus produces binary code characters each signifying a run-length or a Command signal. Command signals may include, for example, such signals as "move to next line" corresponding to an end of line or Margin signal. When the Margin signal is generated, indicating that encoding of a complete line of information is completed, the scanning beam at the transmitter and the corresponding element in the display or printing device at the receiver moves to the next scanning line. This same signal also serves to indicate a blank line.

In order that the several run-lengths be encoded efficiently in accordance with the principles of information theory, the probability of occurrence of these lengths in the material to be transmitted must be known. For example, the simple probability distribution found for typewritten text may be used.

This distribution, which is highly peaked with short run-lengths predominating, lends itself well to statistical encoding, i.e., encoding such that frequently occurring phenomena are assigned short code characters and rarely occurring phenomena longer code characters. One such statistical code, known as the Shannon-Fano code, performs in an acceptable fashion. While a code based on the probability distribution of run-lengths in typewritten text may not be well matched for pictorial material having relatively frequent long runs, this is offset by the fact that the number of runs to be encoded tends to be smaller in such cases. The probability distribution of printed text is, in general, not strongly dependent on the exact spatial arrangement of the subject copy since this chiefly affects the longer runs which have only relatively low probabilities. While the Shannon-Fano code performs well, a Shannon-Fano translator for a large alphabet is extremely complex. Simpler forms of variable lengths encoding offer a reasonable compromise between efficiency of coding on the one hand and instrumentation complexity on the other.

Additional economy in transmission is achieved in accordance with one feature of the invention by identifying runs of the same length by the same code character regardless of whether they are black or white. In this case black lengths are identified by a special code character called the Black signal which instructs the receiver to print the next length black.

An additional feature of the invention is an encoder program in which single black dots are not transmitted. Instead, the printer at the receiver prints a black dot automatically after each white length. Advantage is thus taken of the fact that black and white lengths alternate and that black runs consisting of one dot are common. In all cases, when the edge of the page of copy is reached, the Margin or end of line command signal is generated which steps the vertical deflection at both the transmitter and receiver to the next scanning line. Various other forms of pictorial description may, of course, be used to attain any given degree of transmission economy.

The dot counter 18, which forms a portion of the encoder 17, serves the function of counting dots in a given black or white length to be encoded for transmission. It closely parallels in operation the position indicator 14 in the position memory, and may be of similar construction. An ordinary diode gate circuit 19 of a type well known in the art is employed to admit information from the dot counter to the translator 20 where it is statistically encoded as described above. Translator circuits are well known and may comprise, for example, diode networks which yield for a given set of input states a predetermined set of output states. Normally, the output of the translator is a series of binary pulses appearing simultaneously on a number of parallel leads.

The pulses appearing on the output leads of the translator 20 are applied to a shift register 21 which accepts the information in parallel and releases it serially for transmission. Such circuits are well known and may comprise, for example, ferroelectric flip-flop elements in a form as disclosed in application Serial No. 513,710 of J. R. Anderson, filed June 7, 1955, now Patent 2,876,435, issued March 3, 1959. The shift register 21 additionally receives shift pulses from the digital subset 22, which pulses serve to advance serially through the register 21 the code character received from the translator 20.

The serially arranged pulse group sequences from the shift register 21 are clocked out to the transmission line through digital subset 22. The digital subset is a transmission terminal which accepts digital information from shift register 21, transforms the information into a form suitable for transmission over commercially available facilities such as switched telephone networks. It is assumed to comprise the modulator, synchronization, supervisory-control, and possibly error-control circuitry. All of these elements may, in all respects, be of conventional design.

Whether or not the encoder 17 should accept another run-length specification from the scanner 10 is determined, as mentioned above, by the control logic circuit 12. As soon as the dot counter 18 has counted the dots comprising a full run-length, the control logic causes further signals emanating from the scanner 10 to be ignored even though scanning continues. The position of the last dot supplied to the encoder is, however, recorded in the position memory circuit 13. When the shift register 21 has disposed of previously stored information, the number contained in the dot counter 18 is translated into resulting code characters placed in the shift register 21. At this point the dot counter 18 is reset and is ready to accept the next run-length as soon as this is scanned on the next traverse. No further action ensues until the shift register 21 has been emptied again at which time the process repeats, continuing until all lengths on the given line have been coded. The scanner 10 is then instructed to shift vertically to the next scan line. As the scanning and encoding proceed the shift register 21 supplies information to the digital subset 22 and information flows out onto the line at a constant rate corresponding to the binary digit rate of the line. The sweep rate of the scanner 10 is fast compared to the rate of outpulsing so that no difficulty is encountered in supplying an interrupted flow of information to the subset 22. For an outpulse rate of approximately 1000 binary units per second, for example, a line scanning rate of one kilocycle is ample. With 850 elementary dots across the page, the dot counting rate and, hence, the frequency of the clock generator 11 is approximately one megacycle.

*Receiver*

Figure 2:
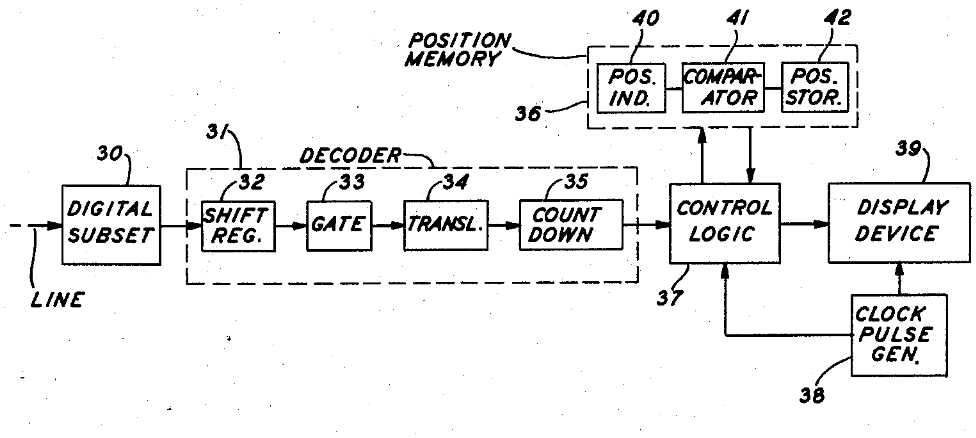
Fig. 2 is an overall block schematic diagram of a simplified illustrative embodiment of the receiver portion of a coded facsimile system in accordance with the invention.

A block diagram of the receiver portion of the system is shown in Fig. 2. Since the procedure at the receiver is the inverse of that at the transmitter, the operation of the corresponding units is similar to that described above.

Information received from the line is passed via the digital subset 30 into shift register 32 which forms a part of decoder 31. When it is recognized that a proper code group has been received, the information stored in shift register 32 is gated by gate 33 through the decoding translator 34 where it is translated and passed on to a count-down circuit 35 which then stores the binary number representing the black or white length corresponding to the code character received. The control logic circuit 37 then causes a white or black trace of the appropriate length to be printed or marked on a recording surface in a display device 39. The placement of this length in the proper location on the line is under the control of a position indicator 40, position storage 42, and comparator circuit 41, all included in position memory unit 36. These units are in all respects similar to the corresponding units at the transmitter.

As indicated above, encoder programming may require the automatic printing at the receiver of a single black dot after each white length has been received. This automatic printing feature may be included in the control logic circuit 37 by conventional means and need employ only additional computer circuitry.

Although the counting and deflection at the receiver are regulated by the pulses emanating from a receiver clock generator 38, identical to the clock generator 11 at the transmitter, it is not at all necessary that the two clock generators be synchronized. Thus, the clocks at the two terminals may conveniently operate at different frequencies, the only result being that printing at the receiver takes place at a different speed in accordance with the data handling capacity of the receiver circuit units. Obviously, the independence of the two units reduces the complexity of the terminal equipment at both terminals of the system.

The display device 39 at the receiver may advantageously be of the storage display tube type with deflection taking place in a manner identical to that of the scanner at the transmitter. Device 39 may, for example, be of the construction described by Knoll, Rudnick, and Hook in an article entitled "Viewing Storage Tubes With Half Tone Display," published in the RCA Review for December 1953 beginning at page 492. Other temporary electrostatic storage-display tubes known commercially as the Memotron and Tonotron, for example, may also be used. Where a permanent record is required, any well-known form of photographic or xerographic technique is employed in conjunction with the display tube.

*Deflection*

The continuous repetitive scanning procedure according to the invention employs horizontal scanning which resembles conventional television scanning, and vertical scanning which proceeds stepwise in response to instructions from the associated logic circuitry. Although continuous scanning in the horizontal direction tends to minimize the problems directly connected with deflection, there remain some rather severe requirements; these concern primarily stability of the deflection voltages or currents. The most essential requirement is that on each of its numerous repeated horizontal sweeps across a given scanning line path the scanning aperture or spot must at all times be at the precise location designated by the count registered in the position indicator. In the vertical direction non-periodic scanning is required. This is not, however, a serious problem because of the relatively low speeds involved. A deflection circuit sufficiently stable for horizontal deflection and meeting the requirements of non-periodic vertical deflection is illustrated in Fig. 3.

In order to insure that the physical location of the scanning spot always corresponds to the registered dot count, the horizontal sweep is generated by means of integrating circuits 53 and 63, each of which counts the same clock pulses counted by the position memory circuit.

Integrating circuits of this sort are well known and may comprise a capacitive element in which successive clock pulses are stored so that the total accumulated charge is increased periodically. The clock pulse generator thus sets the pace of the entire scanning operation. Its frequency is chosen on such a basis that the shift register never runs out of stored information before new information has been scanned and processed. It is assumed that at most one binary digit can be transmitted per millisecond, and that at most 1000 picture elements need be resolved along one scanning line. Consequently, a clock frequency of one megacycle is assumed to correspond to a sweep rate of approximately one kilocycle.

The horizontal deflection waveforms generated by the integrating sweep generator 53 are applied through amplifier 57 to the deflection circuits associated with either the scanner 10 or the display device 39. These units, shown in two views in Fig. 3 are identified by the character 60. At the conclusion of each line sweep the integrating sweep generator 53 is reset. This may conveniently be achieved by utilizing a Reset pulse generated by the recycling of the continuous counter 50 which serves as the position indicator in the position memory circuit. When the horizontal sweep is resetting to the beginning of the next line, the output of the clock pulse generator is interrupted. This may advantageously be done by means of And gate 52 which is normally enabled by one output of pause flip-flop 54. Flip-flop 54 is set by the Reset pulse which is also applied to the integrating sweep 53. Flip-flop 54 remains in the set position for a period D following each completed horizontal line scan. Following this delay, imparted by delay device 55, flip-flop 54 is reset through gate 56 and gate 52 is again unlocked. And gate 56 is also supplied with additional signals from flip-flop 64 in the vertical deflection circuit so that an indefinite interruption of clock pulses, and horizontal deflection, is obtained upon conclusion of a vertical sweep.

It has been found that the use of feedback provides a relatively simple and reliable means for obtaining the requisite high degree of stability for the deflection circuitry. Accordingly, the left and right hand edges of the scanning area of the pickup or display device 60 are interrogated to produce error signals indicative of both the position of the scanning aperture at a particular time, and the size of the scanning area. These signals, which may be derived from elements 61 and formed in detector 59, are passed through amplifier 58 and applied to mixing amplifier 57. Error compensating circuits of this sort are well known. According to one such system, elements 61 may be additional phosphor stripes positioned at the edge of the raster on the face of device 60, and the detector 59 may comprise a photo-sensitive device. Alternatively, elements 61 may be conductive stripes connected to external circuits and detection of the error pulses may be conventional.

Under certain circumstances the vertical deflection may have to remain constant with a high degree of accuracy for periods as long as several seconds. Specifically, it remains constant until a shift command pulse is received from the logic circuitry at the conclusion of the processing of a completed horizontal scan. The average dwelling time between shifts is, however, about one-tenth of a second for material such as a typed business letter. Shift command pulses are applied through pulse former 62 to integrating sweep generator 63 and to multivibrator divider 65. These pulses instruct the vertical deflection circuit to execute one elemental step in the down direction. An integrating circuit 63, similar to circuit 53 in the horizontal deflection circuit, is employed to accumulate the pulses which correspond to the shift commands. Since the integrating circuit must be capable of holding its output over long periods, feedback correction, similar to that outlined above, is employed. Thus, integrating sweep 63 is provided with a second input which is used for control rather than for integration. A correction signal may conveniently be derived from the pickup or display device 60 by causing the scanning beam also to scan an appropriate pattern of lines placed along one edge of the raster. These lines 71 may be composed either of phosphor or conductive material as described above. As the scanning beam is deflected horizontally at a periodic rate of about 1000 line scans per second, a periodic sequence of error samples is thus produced and is available on the elements 71. These signals are applied to amplifier 70 and passed through phase splitter 69 to the integrating sweep 63.

The spot is advantageously stabilized successively on black to white and white to black transitions of the line pattern. Since the waveforms generated at each successive transition have slopes of the opposite sense, the feedback loop phase is switched 180 degrees on successive shift commands. This is done by reversing the state of multivibrator 65 on successive shift command pulses which in turn enables one or the other of the outputs of phase splitter 69 and allows one or the other of the phase splitter output signals to be connected to the sweep circuit 63. And gates 66 and 68 and Or gate 67 are used for this purpose. If this feature is not employed, the control line pattern will be one-half as fine since only every other transition can be utilized.

If both transmitter and receiver at one terminal utilize a common deflection circuit, only one unit need be stabilized. Alternatively, the beam of a third tube may be deflected in synchronism as a slave to generate the required error signals. Regardless of the type of pickup and display device used, appropriate control signals may also be obtained optically from artificial black edges and line patterns placed at the left and right hand margins of the material being scanned. These edges and patterns may be a part of the frame that supports the pictorial copy.

*Transceiver*

Figure 4:
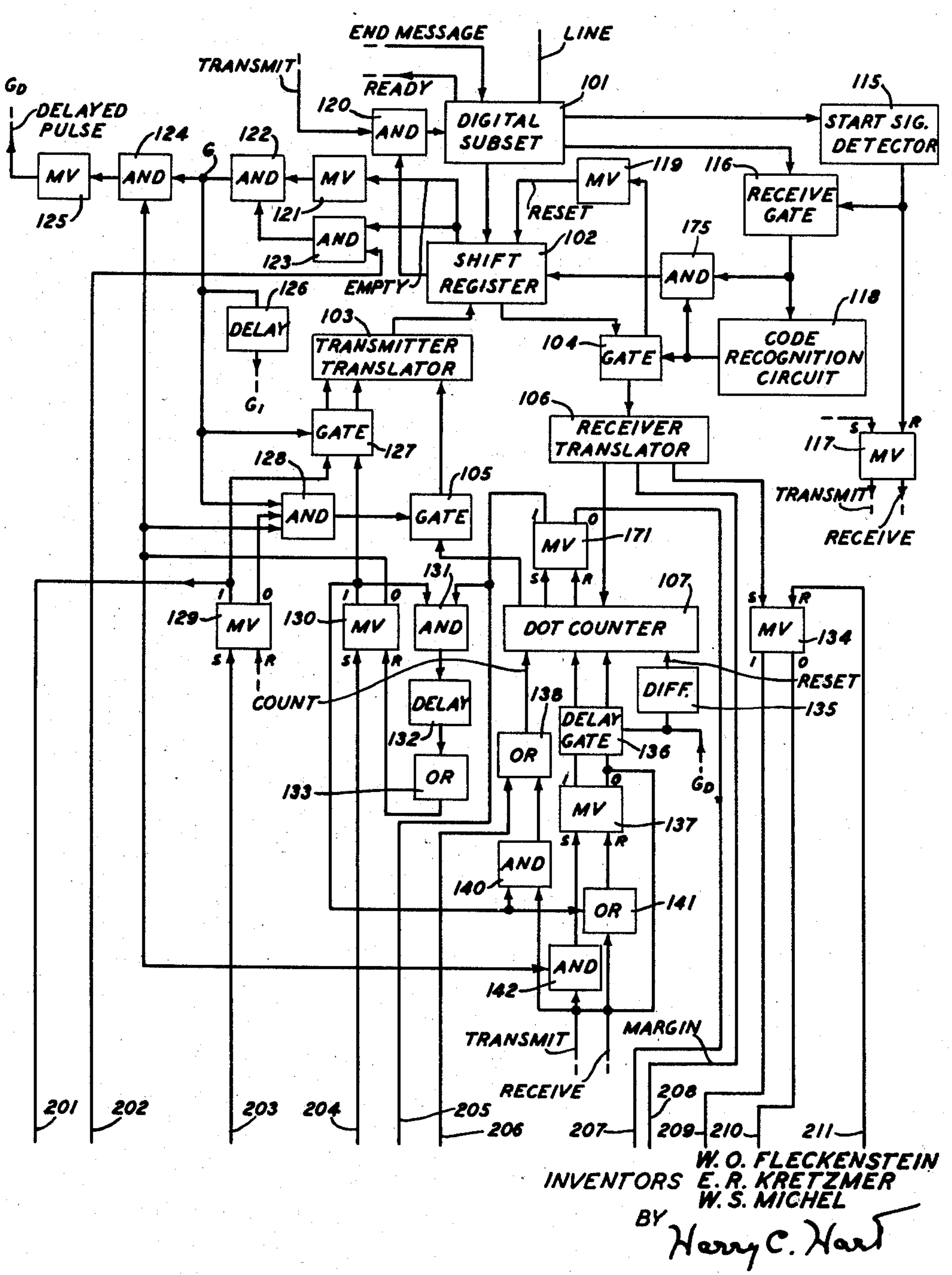
Figs. 4 and 5 taken together form an overall block schematic diagram of a combined transmitter and receiver for use in a coded facsimile system in accordance with the invention.
Figure 5:
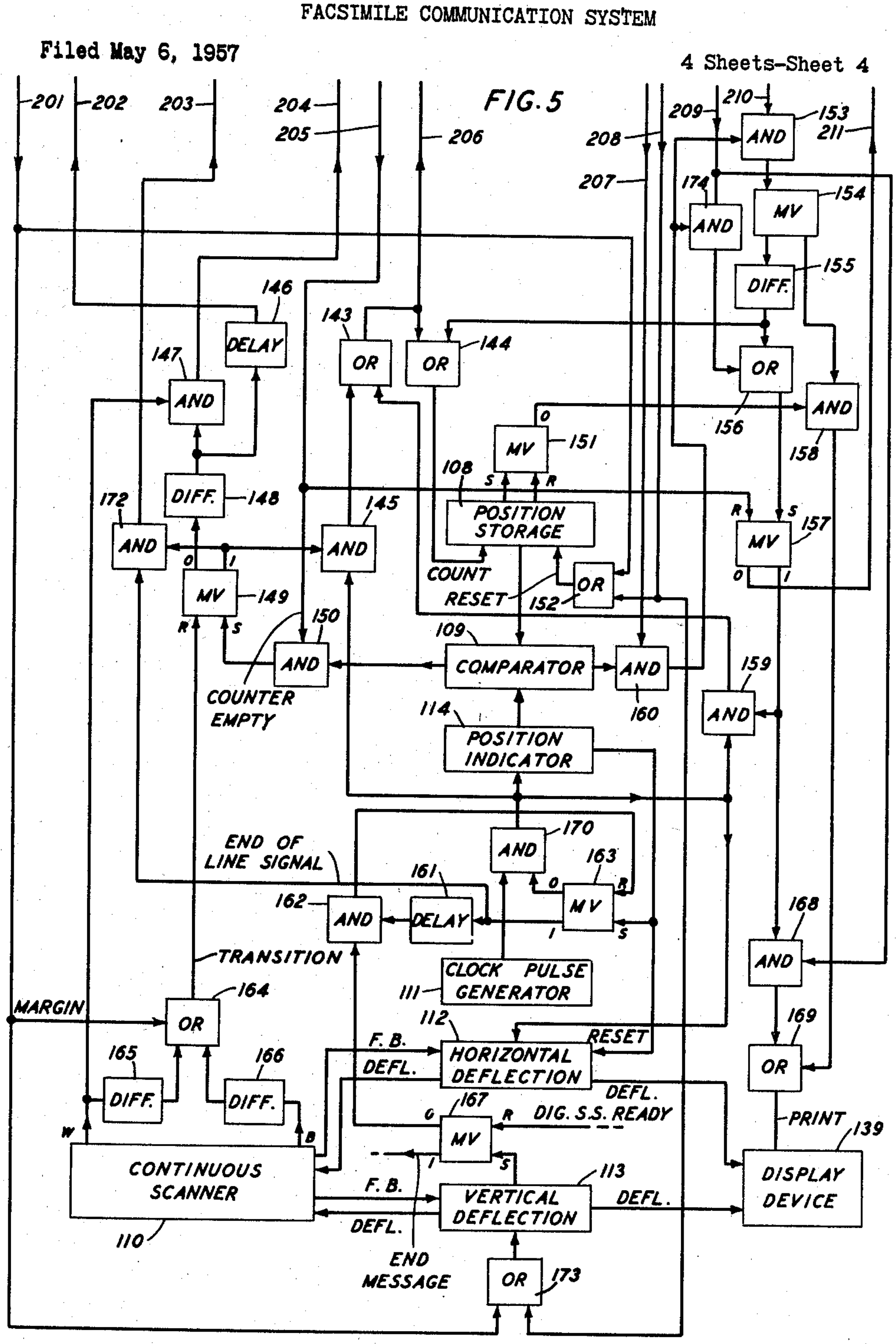

A worthwhile saving in overall transmitter-receiver complexity can be achieved by combining the two units comprising each terminal station so as to use many of the major circuits in common. Figs. 4 and 5 taken together form a detailed schematic of such a complete operative transceiver according to the invention. The scanner 110 and display unit 139 operate from common horizontal and vertical deflection circuits 112 and 113, respectively, of the type described in connection with Fig. 3. The clock pulse generator 111 which sets the pace for the horizontal deflection and the various counter-circuits is also common to both transmitter and receiver operation. Similarly, the position memory circuit comprising the position indicator 114, position storage 108, and comparator circuit 109 are used in common. The comparator 109 compares the contents of the position indicator 114 and the position storage 108 in the same fashion for both transmitting and receiving. It provides an output signal whenever the two counts coincide.

The dot counter 107 also serves a dual function, counting dots in given black and white lengths to be coded for transmission and also acting as a count-down circuit after the reception and translation of incoming information representative of black or white run-lengths. The code translators 103 and 106 and associated gates which form a part of the encoder and decoder, respectively, of necessity remain separate. Similarly, the numerous gates, And circuits, Or circuits and the like comprising the control logic circuits described in connection with Figs. 1 and 2 are shown separately, and the several elements included in these circuits are positioned conveniently near the appropriate operating units. The shift register 102 can serve a dual role by arranging it to accept information in parallel and send it out serially for transmission, and to receive information serially and send it out in parallel during receiving. The digital subset 101 is employed for both receiving and transmitting. All of the other elements shown in block schematic form entail conventional circuitry such as, binary coders, flip-flops, delay multivibrators, And and Or circuits, delay circuits, and differentiating circuits.

In operation, the two portions of the transceiver are individually operated in substantially the fashion heretofore described in connection with Figs. 1 and 2. More specifically the scheme of operation during transmission is as follows.

*Operation as a transmitter*

In using the apparatus for transmitting, the operator first places the terminal in the transmit position by setting the transmit-receive flip-flop 117. This also causes the digital subset 101 to emit a supervisory start signal to inform the receiving station of the forthcoming facsimile transmission. With the transmit-receive flip-flop 117 in transmit state, gate 120 at the input to the digital subset is closed. In this initial state the several counters in the transmitter are empty, that is, they store a count of zero. When the digital subset 101 is ready for transmission of actual facsimile information it resets the vertical flip-flop 167 which in turn sets pause flip-flop 163 through And gate 162 thereby permitting passage of clock pulses into the position indicator 114 and the horizontal scanning deflection generator 112 as described in connection with Fig. 3. As soon as the number of clock pulses held by the position storage 108 equals the number of clock pulses held by the position indicator circuit 114 (zero at the start), the comparator 109 produces an output signal which is passed through And gate 150 to set the count flip-flop 149 which in turn enables And gate 145. This permits the passage of clock pulses into both the dot counter 107 and the position storage circuit 108.

As clock pulses are subsequently counted, the scanning beam traverses the corresponding resolution dots in the subject copy. Assuming the left hand margin of the copy to be white, for the present illustration, the white output lead of the scanner 110 is energized but without any resulting action. The black transmission flip-flop 130 is in the reset condition corresponding to white and the transmit-receive flip-flop 117 is in the transmit state. The up-down flip-flop 137 is set through And gate 142 to a state which in turn sets the dot counter 107 to count upward in the normal fashion. When the scanning beam reaches the first white to black transition, Or circuit 164 resets the count flip-flop 149 to block subsequent clock pulses from the dot counter 107 and position storage or store 108. The clock pulse corresponding to the first black dot is assumed to be included in this count. If the count flip-flop 149 is reset, a pulse is delivered to And gate 147, but this pulse is not passed because the White lead from the scanner is no longer energized. Consequently, the black transmission flip-flop 130 remains in the reset (white) state. Assuming that the initial white run-length is composed of $n-1$ dots, the count now held in both the dot counter 107 and the position store 108 is equal to $n$. Meanwhile, the horizontal deflection continues the scanning operation but the derived output signals are ignored. Each time the position indicator counter 114 recycles, after 850 counts have been recorded, for example, the pause flip-flop 163 is set blocking gate 170, thus preventing the passage of clock pulses. This allows sufficient time for the horizontal sweep to return to the beginning of the line. After a delay D, provided by delay network 161, flip-flop 163 is reset.

Zero flip-flop 171 is now in the reset position indicating that a number larger than zero is held in the dot counter 107. All further comparator output signals occurring whenever the position indicator count passes the count stored in the position store 108 are blocked by And gate 150 and the count flip-flop 149 remains in the reset condition.

Resetting of the count flip-flop 149 after a small delay has been imparted by delay device 126 produces another chain of events. Since the shift register 102 has been empty, And gate 123 is energized and produces a gating signal, abbreviated as the G signal. The G signal enables gate 105 to pass the contents of the dot counter 107 into the shift register 102. The shift register accepts a set of digits in parallel and holds them until they are ready to be pulsed out serially into the digital subset 101. The latter supplies the required shift pulses which control this operation. Since outpulsing is relatively slow, roughly one millisecond between successive digits, this action will require a period longer than the counting sequence outlined above.

After occurrence of the G signal which has gated the dot counter 107 contents into the shift register 102, delay multivibrator 125 yields a delayed pulse $G_D$ which serves to reset the dot counter 107 to zero while simultaneously disabling its coupling circuits in order to facilitate the resetting operation. Consequently, zero flip-flop 171 is set so that And gate 150 is receptive to the next comparator output signal. The next comparator output signal occurs when the position indicator 114 passes the count of $n$ at which time the count flip-flop 149 is set. The same chain of events outlined above now takes place. This time, however, the scanner traverses the next run-length which is assumed, in the present illustration, to comprise $m+1$ black dots. The White output lead of the scanner 110 is therefore not energized. As in the case of the preceding run, clock pulses are again admitted through And gate 145, and counted by the dot counter 107 and position store 108. The latter adds these new pulses to those of the previous run to produce a count of the total number of dots processed.

When the scanner reaches the next transition a number of actions occur. The transition pulse resets count flip-flop 149 preventing any further pulses from being counted. The scanner having passed the black to white transition causes the White lead to be energized which in conjunction with a pulse produced as a result of the resetting of the count flip-flop 149 sends a pulse through And gate 147 to set black transmission flip-flop 130. This serves to indicate that the run-length which has just been counted was black. Since the counting has again proceeded one dot past the transition, the correct number of dots in the black run have been counted although there is a shift to the right by one dot spacing. Momentarily the dot counter 107 holds a count of $m+1$, the position storage 108 holds a count of $n+m+1$, and the flip-flop 130 is set.

Since the flip-flop 130 is set, it actuates Or gate 141 and resets the U.D. flip-flop 137 to the count-down position. This resetting action admits a pulse through And gate 140 and Or gate 138 to be counted in a negative direction by the dot counter 107. Thus, the black dot count $m+1$ just established is diminished by one so that it now equals $m$. The position storage 108, however, keeps the full count of $m+1$ black dots in addition to the preceding count of $n$. No further action ensues until the shift register 102 has been emptied of all digits of the previous run. When this occurs, delay multivibrator 121 produces a G signal which once again causes new information to be put into the shift register. And gate 128 prevents gate 105 from being enabled since flip-flop 130 is set. Instead, the G signal causes gate 127 to pass a Black signal into the transmitter-translator 103 and the latter puts a corresponding group of digits into the shift register 102. After a brief delay, the $G_1$ signal resets flip-flop 130. Delay multivibrator 125, however, does not produce a $G_D$ pulse since flip-flop 130 blocks And gate 124 at the time that the G signal occurs. The resetting action of the flip-flop 130 once again sets the U.D. flip-flop 137 into the count-up condition through And gate 142.

The shift register 102 continues in regular fashion outpulsing binary digits of the Black signal. All other action is suspended until outpulsing is completed. At the instant when the register becomes empty, delay multivibrator 121 produces a G signal which gates the contents of the dot counter 107, indicative of the magnitude of the black run, through gate 105 and transmitter-translator 103 into the shift register 102. A delayed $G_D$ pulse then resets the dot counter 107 to zero, and the dot counter in turn sets zero flip-flop 171. Consequently, And gate 150 is receptive to the next comparator output signal. The next time the position indicator 114 equals the count of $n+m+1$, the count flip-flop 149 is set again and counting begins.

If the run being counted consists of $w$ white dots, the next transition signal resets the count flip-flop 149 and stops the count after going one dot beyond the transition, as before. Thus, the dot counter 107 indicates $w$ and the position storage 108 indicates $n+m+1+w$. As soon as the shift register 102 becomes empty of its previous contents, the dot counter 107 is once again allowed to transfer its information to the shift register 102. It is then reset. The shift register continues outpulsing its contents as before and the dot counter 107 is ready to count the next length which, for this illustration, may be assumed to be a single black dot.

When the position indicator 114 passes the count of $n+m+1+w$, the comparator 109 generates an output pulse. At that instant the scanner 110 is squarely on the single black dot. The comparator output signal sets the count flip-flop 149, and the transition occurring at the end of the black dot resets the count flip-flop 149. Thus, only a single clock pulse corresponding to the first white dot after the single black dot in question has been counted. When the count flip-flop 149 is reset, the White output lead of the scanner 110 is energized and the combination acting through And gate 147 sets the black transmission flip-flop 130. As before, the count of the dot counter 107 is diminished by one. This returns the dot counter to zero since, in the present case, it registered only a count of one. Thus, zero flip-flop 171 is set again. No action has been produced by the single black dot except adding a count to the position storage 108 which now holds a total of $n+m+1+w+1$. The single black dot is thus ignored for transmission purposes but not by the position memory.

The dot counter 107 is then ready to count the next white length in the same manner as before and the process described above continues until the horizontal sweep resets and sends an end of line signal through And gate 172 to set the margin transmission flip-flop 129. Setting of this flip-flop resets the count flip-flop 149 through Or gate 164, steps the vertical deflection by one line through Or gate 173, and resets the position storage 108 through Or gate 152. Since the shift register 102 still contains information pertaining to the previous run, the count flip-flop 149 remains in the reset condition for a sufficient time to permit the vertical deflection to stabilize before counting resumes. When the shift register 102 becomes empty, the G signal permits gate 127 to pass a Margin signal from flip-flop 129 into the transmitter-translator 103 which, in turn, passes a Margin character to the shift register 102. Since flip-flop 129 is still set, it keeps gate 105 locked through And gate 128 so that the count in the dot counter 107 is ignored. After a delay, the $G_D$ pulse resets the dot counter 107 and the margin flip-flop 129. Consequently, zero flip-flop 171 is set and the next comparator output signal initiates counting of the first run-length in the new scanning line.

When the shift register 102 has disposed of the Margin character and again becomes empty, it is ready to accept the new count held in the dot counter 107. After the vertical deflection has shifted, for example, 1050 times, the vertical flip-flop 167 will be set. This setting can be made to initiate any desired action, such as, resetting the system to its normal stand-by condition after the dot counter 107 and shift register 102 have disposed of all stored information. At that time the digital subset 101 is instructed to send an "end-of-message" signal. A signal of this sort may be inserted by any conventional means.

*Operation as a receiver*

As soon as the start signal detector 115 detects a supervisory signal indicating the start of facsimile transmission, it opens the receive gate 116 to pass subsequent digits emitted by the digital subset 101 and also puts the transmit-receive flip-flop 117 into the receive state. After the first received code character, which may be assumed to describe a white length, is demodulated by digital subset 101, it is passed to shift register 102 and to code recognition circuit 118. The latter is a sequential logic circuit of a well known type which recognizes legitimate code groups and, upon receipt of such a group, produces a signal which is utilized to open gate 104 to pass the contents of shift register 102 through the receiver-translator 106 into the dot counter 107 in parallel form. If a code is employed which utilizes so-called "marker" digits in addition to the customary information digits, And gate 175 may be employed in conjunction with code recognition circuit 118 to control the flow of digital information into the shift register 102. After a brief delay, delay multivibrator 119 resets the shift register 102. The dot counter 107 thus stores a count and causes zero flip-flop 171 to be reset indicating that more than zero is in the counter. At this point the position storage 108 contains a count of zero and the position indicator 114 has been counting pulses from the clock generator 111. The clock 111 also controls the horizontal deflection, but clock pulses are passed to the deflection and other circuits only during the active portion of each sweep period. Each sweep period may include, for example, a count of 850 pulses. After each sweep the position indicating counter 114 recycles.

The comparator 109 generates an output whenever the position indicator count equals the position storage count. And gate 160 passes the output of the comparator 109 so long as a count is registered in the dot counter 107. Zero flip-flop 171 is, therefore, in the reset condition. The comparator output is further routed through And gate 153 into delay multivibrator 154. The black flip-flop 134 is in the reset condition, and delay multivibrator 154 attempts to deliver a one microsecond pulse to the display device 139. Since the position storage 108 registers zero and zero flip-flop 151 is set, And gate 158 prevents passage of this pulse. Concurrently, the first picture element of the first or top line in the raster is scanned without printing. One micro-second later the trailing edge of the negative pulse output from delay multivibrator 154 is differentiated by differentiator 155 to form a spike which resets the receiving count flip-flop 157. This spike also adds one count to the position storage 108. The receiving count flip-flop 157 then enables And gate 159 to pass clock pulses into the position storage 108 and the dot counter 107, and enables And gate 168 to actuate the display device 139. However, the black flip-flop 134 is not set, so that the display is not actuated. It is assumed for this illustration that the active display or print condition corresponds to black. This is true, for example, in dark-trace display tubes.

Clock pulses are then counted in regular fashion by the position storage 108 and in a downward direction by the dot counter 107. The latter, which may hold a previously counted number $n$ corresponding to the first received code character, is arranged to count-down so long as the U.D. flip-flop 137 is in the reset state.

Counting continues until the dot counter 107 registers zero and the position storage 108 registers $n+1$ at which time zero flip-flop 171 is set. Its output immediately resets receiving count flip-flop 157 which stops all further clock pulses from being counted. This action requires a total of $n+1$ microseconds assuming a one megacycle counting rate. In the case of a left hand white margin of about one inch, for example, $n$ may be about 100 corresponding to a definition of 100 dots per inch. During this time the next code character is received at a rate, for example, of approximately one binary digit per microsecond. This may represent a black signal. Horizontal deflection continues during this time without printing. As before, the code recognition circuit 118 detects the completion of reception of the character and, as explained hereinabove, controls its transfer from the shift register 102 through gate 104 into receiver-translator 106. As soon as the code character is admitted to the receiver translator 106, the Black output is energized setting the black flip-flop 134. After a brief delay provided by delay multivibrator 119, the shift register 102 is reset. No further action ensues since the dot counter 107 holds a zero count and zero flip-flop 171 is in a set position. The position storage 108, however, holds a count of $n+1$.

The next code character corresponding to a black run-length is received and the corresponding binary count is passed into the dot counter 107 by way of gate 104 and the receiver-translator 106. Zero flip-flop 171 is now reset. When the position indicator 114 count equals $n+1$, the comparator 109 produces an output pulse which passes through And gates 160 and 174 and Or circuit 156 to set the receiving count flip-flop 157. Consequently, a black trace on the display device 139 is initiated through And gate 168 and Or gate 169, and clock pulses are admitted through And gate 159 to both the dot counter 107 and the position storage 108. The former counts down while the latter counts up adding to its previous count of $n+1$.

If the count corresponding to the black length being processed is $m$, it will require $m$ clock pulses to return the dot counter 107 to zero and to set zero flip-flop 171, barring further clock pulses, and to reset the receiving count flip-flop 157. This in turn ends the black trace and resets black flip-flop 134. Position storage 108 now holds a count of $n+1+m$.

The next character is now received. It may represent a white run-length of $w$ dots and is processed as before except that the position storage 108 count now exceeds zero so that zero flip-flop 151 is in the reset condition. Consequently, the comparator 109 output through delay multivibrator 154 immediately activates the display device 139 for one microsecond producing one black dot adjoining the previously printed black trace. This is necessary because the preceding black run had a length one dot greater than given by the received character. At the end of the microsecond, the receiving count flip-flop 157 is set and one count is added to the position storage 108 to account for the black dot just printed. It now holds a count of $n+1+m+1$. The previous counting action now takes place again, and at the conclusion, the position storage 108 holds a count of $n+1+m+1+w$.

If the last white character is followed by another white character, a single black dot will be printed between this and the previous white run. This will occur as before since the comparator 109 output will again trip delay multivibrator 154 which remains in that state for one microsecond before counting begins, thereby producing a black dot in position $n+1+m+1+w+1$ preceding the new white run. In this way every white length is preceded by a black dot except the first one in a line. The first length is, through the action of zero flip-flop 151, increased instead by one white dot which merely increases the width of the margin.

After the process described above has continued in the manner described, the receiver-translator 106 will detect eventually a Margin signal and its Margin output lead is then energized. This resets the position storage 108 to zero through Or gate 152, and steps the vertical deflection down one line through Or gate 173. Since the dot counter 107 contains a count of zero, no further counting action can take place until the next code character has been received in its entirety. The vertical deflection circuitry will, therefore, have sufficient time to stabilize on the new scan line. The next length decoded will be displayed or printed at the beginning of the new scanning line and thereafter the actions described hereinabove will be repeated on this and on successive scanning lines.

When the vertical deflection has shifted 1050 times, for example, it will set vertical flip-flop 167 on the 1051st shift signal thereby initiating any other actions that may be desired. Thus the display device 139 may be photographed to produce a permanent record, or the transmit-receive flip-flop 117 may be gated again to the transmit state. Alternatively, these actions may be initiated by receipt of "end-of-message" command signal by the digital subset 101.

Although the invention has been described in terms of electronic beam scanning, it is at once obvious that the principles of the invention may equally well be applied to mechanical scanning systems. Moreover, the choice of the form of code employed and the choice of encoding equipment may be from any of the well-known codes and devices for performing the encoding that are well known to those skilled in the art. Similarly, the invention is not limited in application to the exemplary system shown but is generally applicable to communication systems requiring the conversion of pictorial matter to electrical signals.

What is claimed is:

1. A visual communication system for transmitting signals representative of the light values of a two-valued object field over a narrow band channel which comprises, at a transmitter station, an image scanning element, means including said image scanning element for developing an image signal related to the light value of a portion of said field, means for causing said scanning element repeatedly to scan each of a plurality of line paths in said field, means for enabling said signal developing means during a preassigned period of a selected individual scan of a single line path to derive therefrom a sequence of image signal samples representative of a portion of the total image signal samples in said line path, whereby image signals are developed from said entire object field in the course of said repetitions, means for converting said derived image signal samples into code elements, means for transmitting said code elements to a receiver station, and, at said receiver station, means for reconstituting a sequence of incoming code elements into a visual image.

2. A visual communication system for transmitting signals representative of the light values of a two-valued object field over a narrow band channel which comprises, at a transmitter station, an image scanning element, means including said image scanning element for developing an image signal related to the light value of a portion of said field, means including deflecting means for causing said scanning element repeatedly to scan each of a plurality of line paths in said field at a preassigned constant rate, means for enabling said signal developing means during a preassigned period of a selected individual scan of a single line path to derive therefrom a sequence of image signal samples representative of a portion of the total image signal samples in said line path, means for converting said image signal samples derived from single scans of said single line paths into a modified sequence of image signal samples in accordance with the spatial distribution of image signal samples in said field, means for transmitting said code elements as a sample train to a receiver station, and, at said receiver station, means for reconstituting an incoming sample train into a visual image.

3. Apparatus as defined in claim 2, wherein said means for enabling said signal developing means includes means for generating for each transition of picture elements from a first light value to a second light value, a code character indicative of said first light value, and of the spatial extent of said picture elements.

4. Apparatus as defined in claim 3 wherein said converting means includes means for suppressing the generation of a code character representative of a picture element having a second light value following the occurrence of a code character indicative of a picture element having a first light value.

5. A narrow band image signal transmission system which comprises, at a transmitter station, an image scanning element, means including said element for developing an image signal related to the light value of a portion of an object field, means for causing said scanning element repeatedly to scan each of a plurality of line paths in said field, means for enabling said signal developing means during a preassigned period of a selected individual scan of a single line path to derive therefrom a sequence of image signal samples whereby image signals are developed from said entire object field in the course of said repetitions, means responsive to the statistical arrangement of pictorial matter within said object field for encoding said derived image signal samples, means for transmitting said encoded image signal samples to a receiver station, and, at said receiver station, means for reconstituting a sequence of incoming code elements into a visual image.

6. In a communication system for the transmission of signals representative of the light values of a two-valued object field over a telephone line between a transmitter station and a receiver station, means at said transmitter station for generating a sequence of regularly occurring clock pulses, image scanning means deflectable in a first coordinate direction in synchronism with said clock pulses for repeatedly traversing each of a plurality of line paths within said object field, means including said scanning means for developing from each scan of said line paths electrical image signals representative of successive picture elements in said line paths, first counting means for continuously counting clock pulses during said repeated traversals of each of said line paths thereby to continuously indicate the relative position of said scanning means in successive traversals of said line paths, means for detecting transitions between a first light value and a second light value of picture elements within said line paths, second counting means for counting said clock pulses during successive sequences of picture elements having closely related light values, and registering the total number of elements counted, comparator means supplied with signals representative of the instantaneous count in said first and said second counting means for developing a control signal upon the occurrence of an equal count in said first and said second counting means, encoding means for converting said electrical image signals into code elements, means responsive to said control signal for effecting a transfer of said image signals to said encoding means, and means for transmitting said encoded picture elements to said receiver station.

7. In combination with the communication system as defined in claim 6, means operative upon the completion of a plurality of scans of each line path for shifting said scanning means in a second coordinate direction by the width of a single one of said scanning lines, said second coordinate direction being normal to said first coordinate direction.

8. The communication system defined in claim 6 wherein said encoding means converts said electrical image signals into code elements according to the statistical distribution of picture elements having similar values within said object field, assigning short code characters to frequently occurring values and longer code characters to less frequently occurring values.

9. A communication system for the transmission of facsimile signals over a telephone line between a transmitter station and a receiver station which comprises, means at said transmitter station for generating a first sequence of regularly occurring clock pulses, image scanning means deflectable in a first coordinate direction in synchronism with said clock pulses for repeatedly traversing each of a plurality of line paths within the pictorial matter being scanned, means including said scanning means for developing during preassigned time intervals image signals representative of successive picture elements in the direction of scanning in each of said plurality of said line paths, first counting means for continuously counting clock pulses during said repeated scans of each of said line paths, second counting means for continuously counting said clock pulses during said preassigned time intervals, comparator means responsive to each occurrence of a like count in said first and said second counting means for developing a control signal, translator means responsive to said control signal for converting said image signals into code characters according to the spatial distribution of said picture elements in said pictorial matter, means for transmitting said code characters to a receiver station, and at said receiver station, means for reconstituting a sequence of incoming code characters into a visual image.

10. A communication system as defined in claim 9 in combination with means operative upon the completion of a number of scans of each line path for shifting said scanning means in a second coordinate direction by the width of a single one of said scanning lines, said second coordinate direction being normal to said first coordinate direction.

11. A communication system as defined in claim 9 wherein said reconstituting means comprises an image reproducer having an electrosensitive luminescent screen, means for projecting an electron beam onto said luminescent screen, and beam deflecting means, means for generating a second sequence of regularly occurring clock pulses, means including said deflecting means for causing said beam to scan said electronsensitive screen in synchronism with said clock pulses, traversing each of a plurality of line paths a number of times, and means for translating incoming code characters into modulations of said beam, thereby to form on said electroluminescent screen, a visual counterpart of said pictorial matter.

12. A visual communication system for transmitting signals representative of the light values of a two-valued object field over a communication channel at a predetermined information rate of flow comprising, means for scanning successive line paths within said object field, traversing each of said line paths a plurality of times in one direction at relatively high speed, means for enabling said scanning means during a preassigned time during each of selected scans of each line path thereby to derive from said scanning operation a sequence of image signal samples occurring at said predetermined information rate, means responsive to the statistical arrangement of pictorial matter within said object field for encoding said derived sequences of image signal samples, means for transmitting said encoded image signal samples as a sample train over said channel to a receiver station, and at said receiver station, means for reconstituting an incoming encoded sample train into a visual image.

13. A visual communication system for transmitting signals representative of the light values of picture elements within a two-valued object field comprising means for scanning successive parallel line paths within said object field, traversing each of said line paths a plurality of times at relatively high speed, means for enabling said scanning means during preassigned time intervals, means for deriving from said scanning operation electrical signals, means responsive to the statistical arrangement of pictorial matter within said object field for converting said derived electrical signals into code characters for transmission to a receiver station, and, at said receiver station, an image reproducer including an image receiving screen and means for establishing on said screen a visible trace, means for causing said trace establishing means to repeatedly scan adjacent parallel lines in said screen, means for deriving from said received code characters electrical signals, and means controlled by said electrical signals for enabling said trace establishing means for preassigned time intervals during successive scans of each of said lines, thereby to establish a visual counterpart of said object field.

14. In a facsimile system means for generating electrical signals representative of successive groups of picture elements having like light values occurring in each of a plurality of scanning line paths within an object field, means for translating each of said electrical signals into a plurality of binary pulses, means for converting said binary pulses into code elements according to the statistical distribution of picture elements having like light values within said object field, means for identifying code elements representative of groups of picture elements of equal lengths by a separate code element independent of the light value represented by said code elements, means for identifying the light value of the group of picture elements represented by said first separate code element with a second separate code element, means for transmitting all of said derived code elements to a receiver station, and, at said receiver station, means for reconstituting successive sequences of incoming code elements into a visual image.

15. A facsimile system comprising means for scanning each one of a plurality of successive parallel line paths within an object field many times at a fast, constant rate, means for selectively generating electrical signals representative of the light value of successive groups of picture elements having like light values occurring in each scanning line path within said object field and the number of picture elements comprising each of said groups, means for translating each of said electrical signals into a plurality of binary pulses, means for converting said binary pulses into code elements according to the statistical distribution of picture elements having like light values within said object field, means for transmitting said derived code elements to a receiver station, and, at said receiver station, means for reconstituting successive sequences of incoming code elements into a visual image.

16. A facsimile system according to claim 15 wherein said object field comprises a plurality of picture elements having either a first or a second light value, and in which said translating means automatically suppresses the translation of binary pulses representative of a single picture element having a second of said light values, following the occurrence of each picture element having said first light value.

17. A facsimile system according to claim 16 in which said means at said receiver station for reconstituting successive sequences of code elements into a visual image automatically generates a visual counterpart of a picture element having said second light value following the occurrence of a sequence of code elements indicative of said first light value.

18. Apparatus for transmitting signals representing the light values of picture elements in a pictorial object field which comprises, at a transmitter station, an image signal generator having a photosensitive screen, means for projecting an electron beam onto said screen, and beam deflecting means, means including said beam projecting means for developing an image signal element from the impact of said beam on the element of said screen, means including said deflecting means for causing said beam repeatedly to scan continuous line paths in said screen, traversing each of said line paths a plurality of times, means for briefly enabling said signal developing means during selected line path traversals to derive a sequence of image signal samples, means for transmitting said image signal samples as a sample train to a receiver station and, at said receiver station, means for reconverting an image sample train into a visual image.

References Cited in the file of this patent

UNITED STATES PATENTS

| | | |
|---|---|---|
| 1,910,596 | Bartholomew | May 23, 1933 |
| 2,681,385 | Oliver | June 15, 1954 |
| 2,752,421 | Ross | June 26, 1956 |